Sept. 19, 1967 W. J. OJA 3,341,890
APPARATUS FOR PRODUCING ELONGATED FELTS
Filed Oct. 1, 1963 6 Sheets-Sheet 3

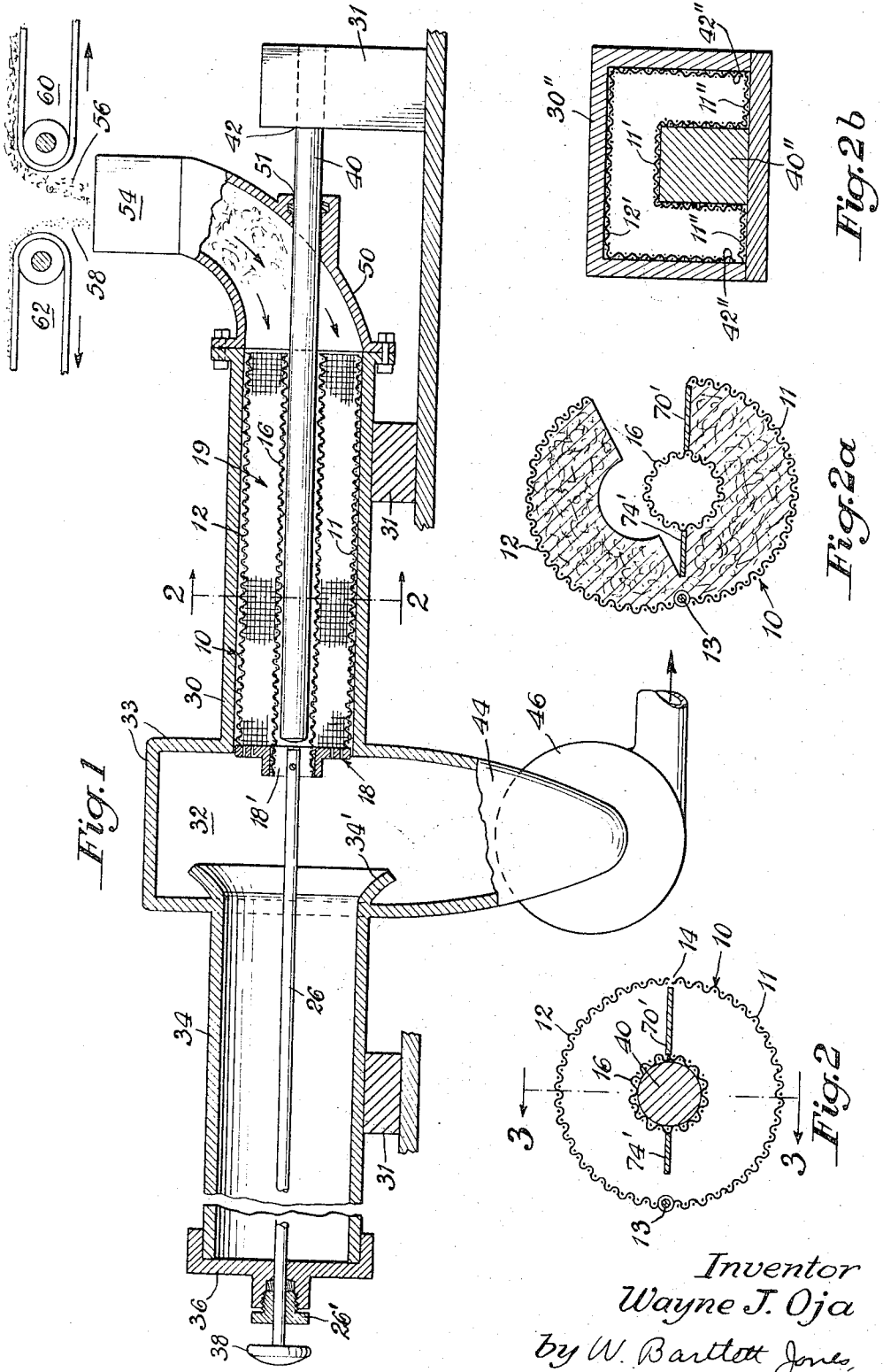

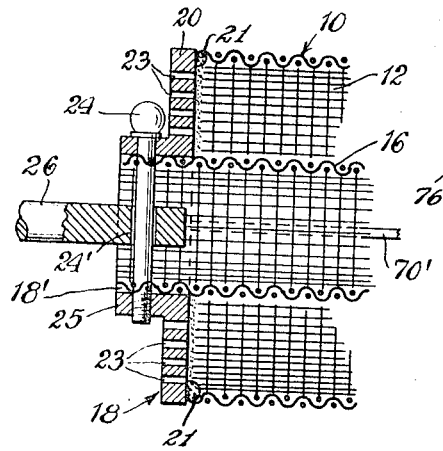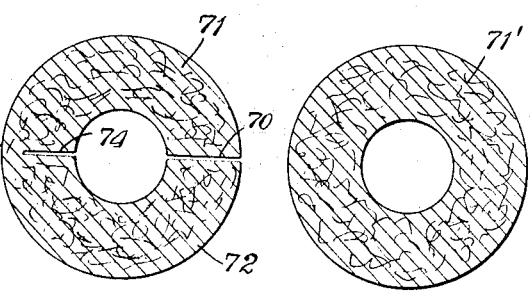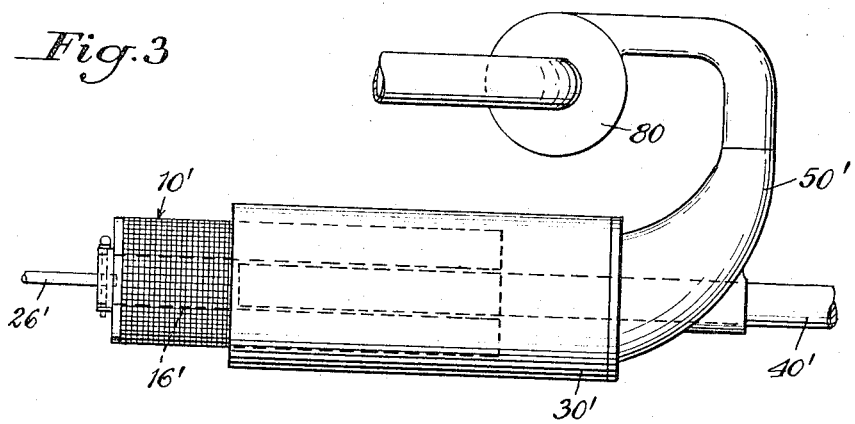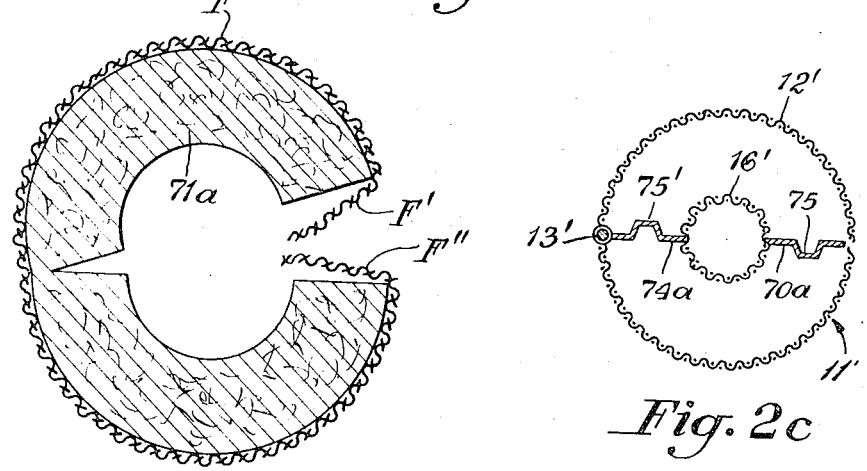

Inventor
Wayne J. Oja
by W. Bartlett Jones
Attorney

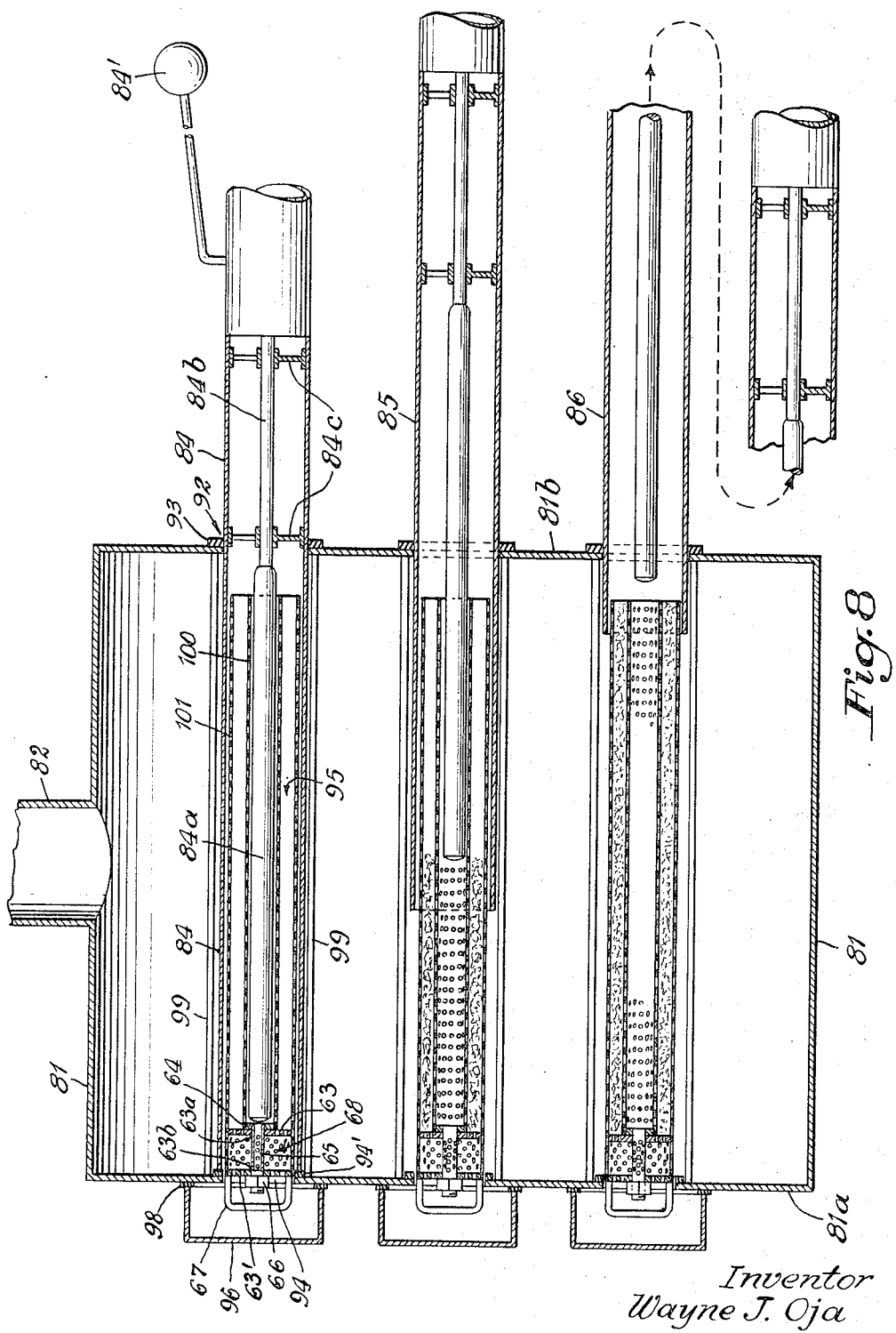

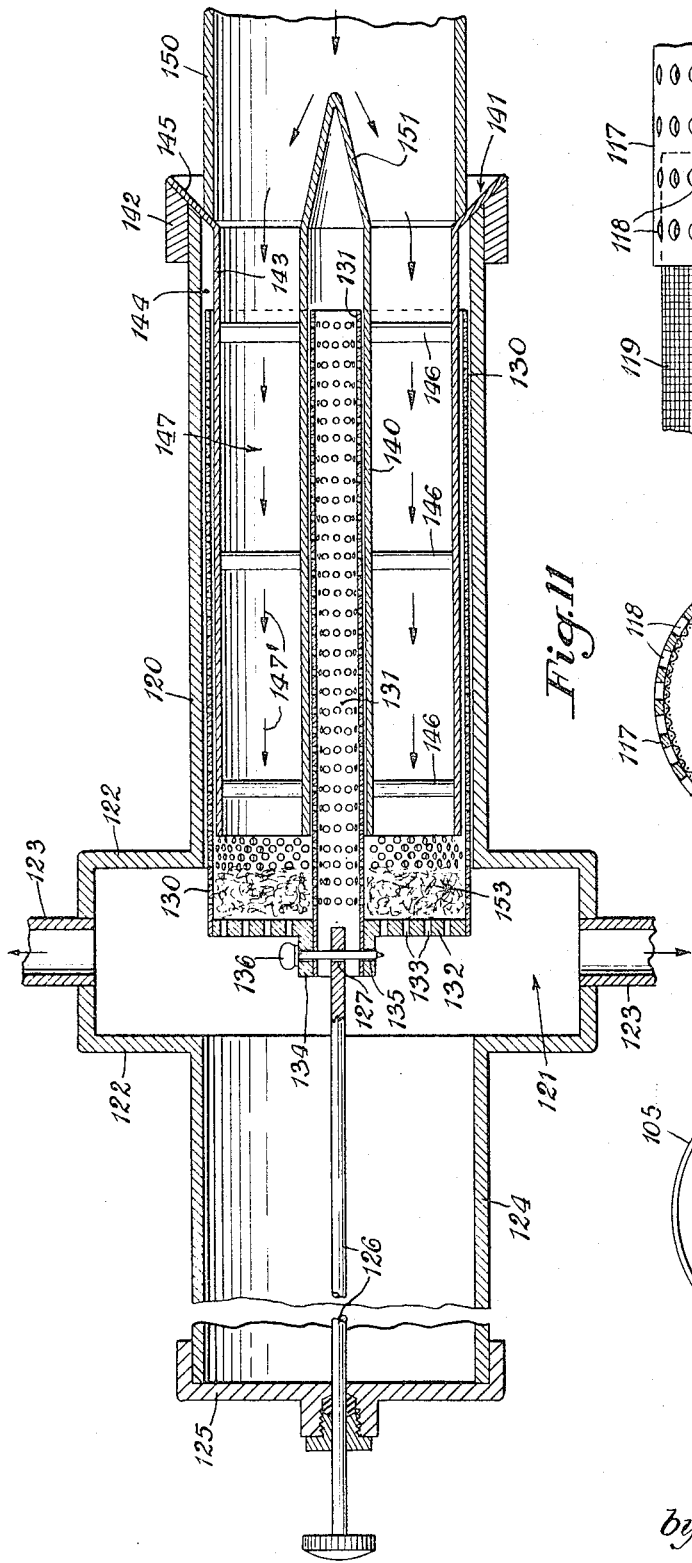
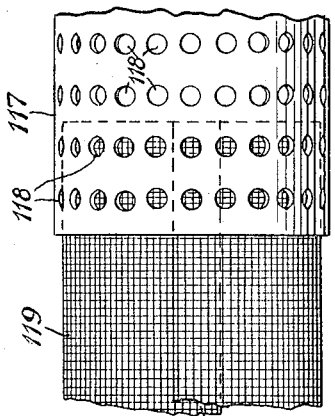
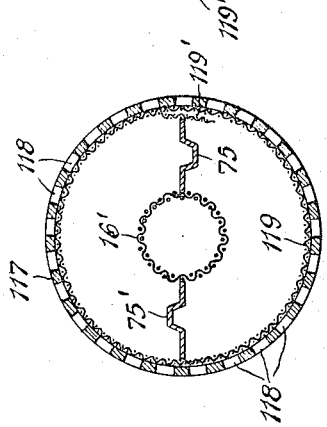
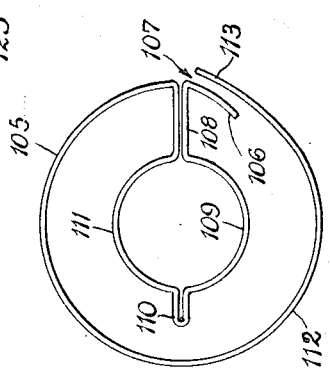
Inventor
Wayne J. Oja
by W. Bartlett Jones
Attorney

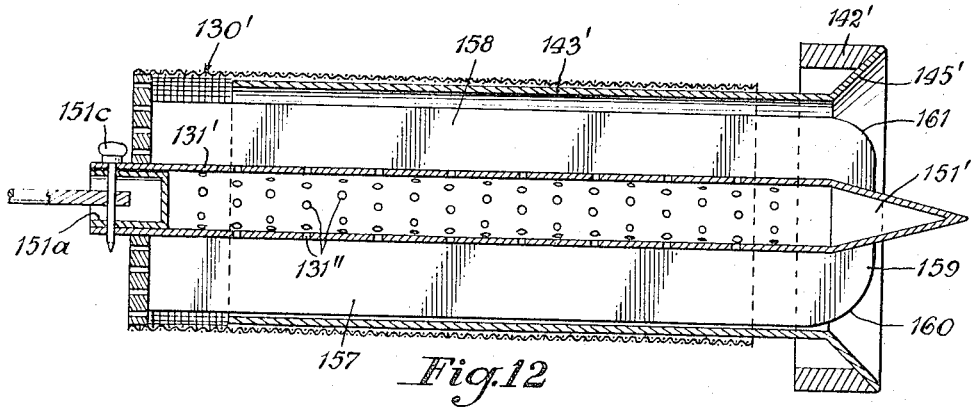
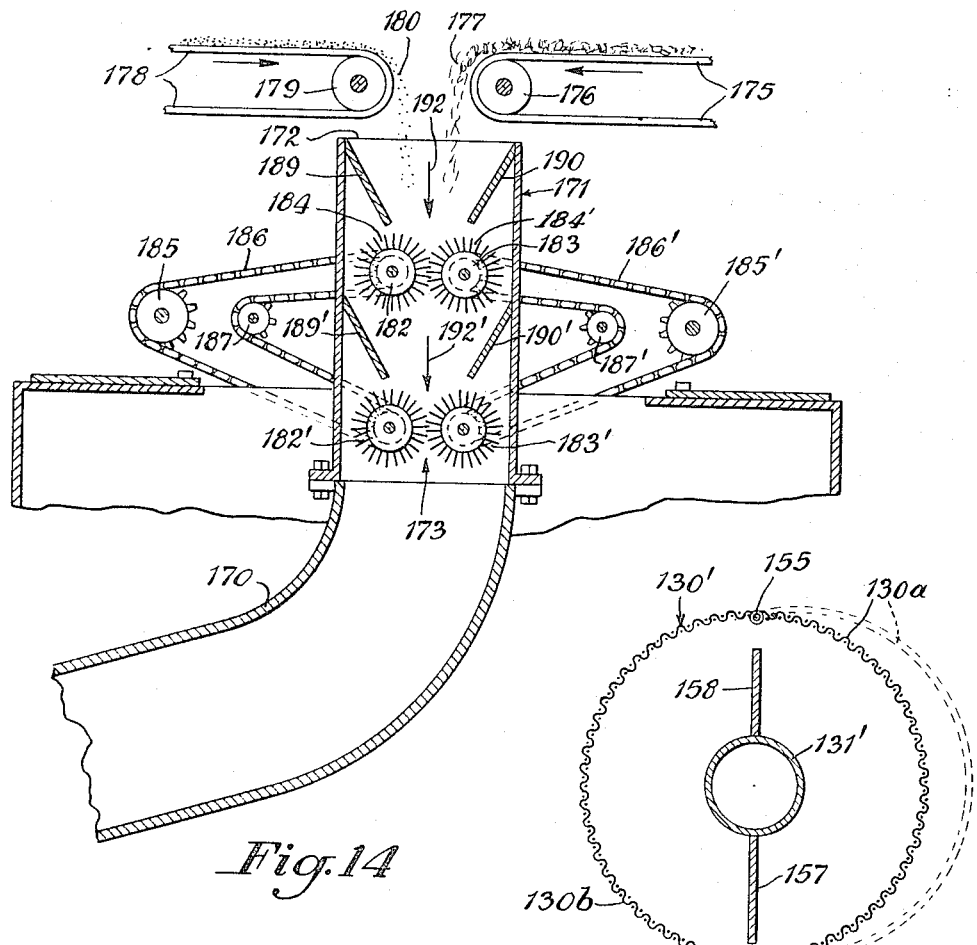

United States Patent Office 3,341,890
Patented Sept. 19, 1967

3,341,890
APPARATUS FOR PRODUCING ELONGATED
FELTS
Wayne J. Oja, Cloquet, Minn., assignor to Wood Conversion Company, St. Paul, Minn., a corporation of Delaware
Filed Oct. 1, 1963, Ser. No. 312,974
2 Claims. (Cl. 18—5)

The present invention relates to apparatus for the production of elongated forms of felted fiber, and in particular, to tubular forms or parts to produce tubular forms, for use as insulating pipe covering.

It is the general object of the invention to provide apparatus to felt fibers progressively into an elongated felt by deposition from air suspension.

It is a particular object of the invention to provide apparatus to felt fibers with activatable binder therefor, and then to activate the binder in situ.

Various other and ancillary objects and advantages of the invention will become apparent from the following exemplary embodiments adopted for illustrating the principle of the apparatus of the invention, describing specifically the production of pipe covering.

In general, the elongated form is produced by introducing an air-suspension of fiber and binder therefor into a first end of an elongated mold for the form having mold walls with fiber-retaining foramens, against which walls the fiber is felted while the air is exhausted through the foramens. By suitable shielding or closure means all of the foramens are initially blocked. At the beginning of the felting operation, the foramens are progressively uncovered or exposed for exhausting air, beginning at the second end and continuing to the first end. Thus, the felting takes place progressively from the second end to the first end with the exhaustion of air taking place mainly through the foramens with some exhaustion felt already formed.

The apparatus is so constructed that differential pressure is created between the interior of the mold and the exterior of the mold. Also, the progressive exposure of the foramens is effected by relative movement between the mold walls and the shielding or blocking means.

In the drawings:

FIG. 1 is a partly schematic vertical cross-section of one form of apparatus using differential pressure between the atmosphere and suction means.

FIG. 2 is a cross-section on line 2—2 of FIG. 1 showing only a foraminous mold of FIG. 1

FIG. 2a is a cross-section of a mold according to FIG. 2 as it is being opened with the felt included therein.

FIG. 2b is a modified mold for producing a form having a U-shaped cross-section, the mold being shown within a rectangular shielding cell.

FIG. 2c is a modified mold for producing two identical halves each with cooperating keys and keyways.

FIG. 3 is an enlarged vertical cross-section on the line 3—3 of FIG. 2, showing detail of the end construction of the mold.

FIG. 4 is a view in cross-section of a felt which may be formed in the mold of FIG. 2.

FIG. 4a shows the cross-section of a felt formed in a mold lined with a fabric remaining with the felt.

FIG. 5 is a schematic modification of FIG. 1, showing use of differential pressure between a pressure blower and the atmosphere.

FIG. 6 is a modified form of the felt of FIG. 4.

FIG. 8 is a cross-section of an apparatus which is a modification of that of FIG. 1.

FIG. 10 is a profile view of a foraminous mold made from one piece of material such as a stiffened woven fabric.

FIG. 10a is a modified form of mold having a continuous cylindrical foraminous outer wall and removable fine-mesh screen liner.

FIG. 10b is a side view of the mold of FIG. 10a showing the filled liner being withdrawn.

FIG. 11 is a modified form of the apparatus shown in FIG. 1, in which are provided removable fixtures for mounting within the housing for producing different sizes of the elongated forms.

FIG. 12 shows a modified form of foraminous mold and modified fixture therefor to be used in the housing of FIG. 11.

FIG. 13 is a cross-section of a mold having an imperforate inner shell.

FIG. 14 is the representation of a dispersing means suitable for both mineral and vegetable fibers.

Figure 9:
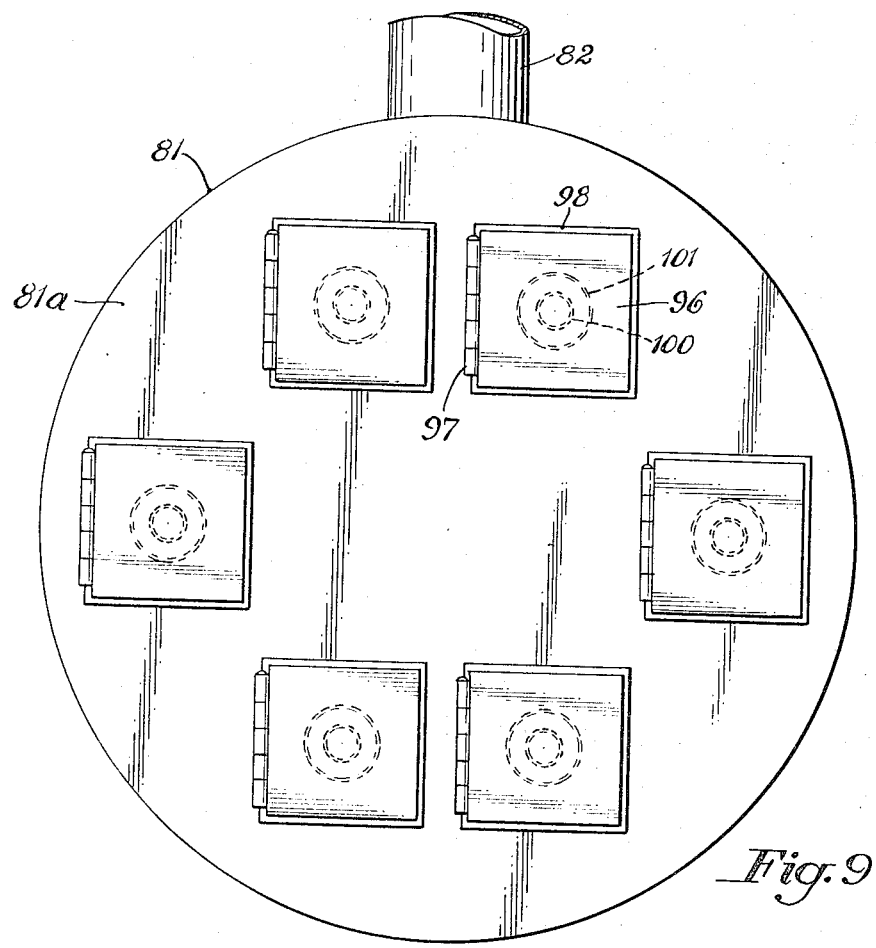
FIG. 9 is an end view of the apparatus of FIG. 8.

The invention is herein illustrated by reference to several forms of apparatus for forming pipe coverings and for progressively felting a variety of elongated felts not necessarily tubular nor cylindrical. The mold and the shielding means are shaped according to the cross-section of the elongated form to be felted.

A tubular felt may be formed within a mold having confining shells, of which at least one is foraminous, defining the interior and exterior walls of the tubular form. For pipe-covering forms, the two shells are cylindrical and concentric, and are removable axially together as a unit away from and relative to a foramen-blocking means, herein referred to as a shield, to expose the foramens to open space, said means serving to block the passage through the foramens of the mold, and to permit opening of the passage through the foramens as they are uncovered by the said relative movement.

The shell is constructed so that in initial or starting position, passage of air through all the foramens of the mold is effectively blocked. As shown in FIG. 1, in said initial position, a cantilever-supported mandrel extends from a first end into an inner shell and in such close proximity to it that it functions as a shield and effectively blocks passage of air through any foramens which may be present in the inner shell. Another wall is located in such close contact with the wall of the outer shell that it functions as a shield and effectively blocks passage through any foramens therein, it being understood that at least one of said inner and outer shells has foramens and that both shells may have foramens. In FIG. 1, the shield for a foraminous outer shell is a wall of a housing into and out of which the foraminous mold is moved with the outer shell in close contact with the housing wall or cell. In another form later described, the shield is part of a fixture having a wall in close contact with the interior of a foraminous wall of the mold. Closure means for the space between the shells is provided at the end where felting begins.

The mold need not be in one unitized piece, such as the unitized mold of FIG. 1. Pipe coverings are provided in many sizes with various combinations of inner and outer diameters, such that any one of several sizes of outer shells may be combined with any one of several sizes of inner shells. For simplifying explanation, FIG. 1 shows a unitized mold.

In the initial shielded position of the unitized foraminous inner and outer shells which constitute the foraminous mold of FIG. 1 for forming a tubular felt, substantially no air can pass through the walls of the shells, but as the shells are moved relatively away from their shields into open space, a differential air pressure is provided between said open space and the space between the shells, in a direction to receive fibers in air suspension within the shells and to deposit and felt them against the shells by venting air through the exposed foramens. In one form of apparatus, the said open space is within a closed chamber from which air is exhausted by a suction fan, thus permitting the feeding of an air suspension containing the fiber into the space between the shells, from a region at atmospheric pressure or at superatmospheric pressure. When the fibers are fed from superatmospheric pressure, the open space need not be at sub-atmospheric pressure, but may be at atmospheric pressure, thus permitting dispensing with a closed chamber as mentioned above.

FIG. 1 represents suitable apparatus for practice of the invention without resort to mechanical details of construction not pertinent to understanding the nature of the apparatus, of the method and of the product, which illustrate the present invention.

A foraminous mold for a tubular form is provided in which fiber is felted by air-deposition. The mold comprises an outer cylindrical shell 10 which is foraminous, as when formed of woven wire screening. As shown in FIG. 2, it is formed in two half-portions 11 and 12, hinged together at 13, and opening at 14 to remove the felt formed therein. An inner foraminous cylindrical shell 16 is centered within shell 10 and at one end is removably secured to end-means 18 shown schematically in FIG. 1, which functions as a fiber-obstructing means over the space 19 between the shells. The region within the inner shell 16 is open for passage of air from it through an opening 18' and said space-closing end-means 18.

End-closure 18 serves to connect the ends of the outer shell 10 and inner shell 16 to unitize them so that they may move together axially as hereinafter described. The end-closure 18 does not block passage of air outwardly from inside inner shell 16, thus permitting air from the tubular space 19 to pass through the inner shell 16 and out past the end-closure 18, through said opening 18' but only when the foramens of inner shell 16 are not blocked. In the mold having space 19, the foramens in the outer shell are adequate to effect progressive uniform felting of the fibers in the space 19 without need for the inner shell to be foraminous. Foramens in the inner shell are advantageous for activating binder in the felt as later described herein.

The end-closure 18 may also be utilized to pull and push the unitized shells axially, as by means attached to it as later described.

One way to provide all these functions of end-closure 18 is to use a fiber-obstructing filter plate 20 (FIG. 3) secured to the end of one semi-cylindrical section of the outer shell 10, as by welding 21 at the end of section 12. Foramens 23 are provided in plate 20 over the space 19 between the shells, but these may be omitted, especially when the thickness of space 19 from shell to shell is sufficiently small so that the adjacent foramens in a shell effect adequate fiber felting against plate 20.

The area of the plate 20 over the end area of the inner shell 16 is suitably open at 18' for easy passage of air, but as shown, it is partially covered by a crossing bar or pin 24 through holes in a ring flange 25 on plate 20, into which fits the end of inner shell 16, with holes through the shell for passing the pin 24. The pin 24 passes through an opening 24', such as a hole or the recess of a hook at the end of a pulling rod 26.

The initial inoperative position of the foraminous mold is within a cylindrical foramen-blocking cell from which the outer shell 10 may slide axially out of the cell, across an open space to means for supporting the unitized shells when the mold is at least in part out of its cell. The mold-shielding is formed by tubular wall-means 30, fixed relative to a base or or framework designated 31 for reference. When suction is provided, as mentioned, an open space 32 is provided within a closed chamber formed in part by wall-means 33 located radially outwardly from the shell-discharging opening of the cell, so as fully to expose the foramens of the outer shell 10 as they enter said space 32. The open space 32 is extended by wall means to support the mold after it leaves its cell, for example, by a tubular housing 34 having a removable closure cap or seal 36 through which pulling rod 26 is removable through a suitable seal 26'. Handle 38 represents means for moving the mold axially. A funnel-like annulus 34' guides the shell 10 into the supporting chamber of housing 34.

Means is preferably provided in the normal position of the mold in its cell to block passage of air through the inner shell when it is foraminous. This may be effected by providing a mandrel 40 as a cantilever supported at 42 by framework 31, of size to fill the inner shell, and of length to extend to end-closure 18 (FIG. 1) in its initial position.

The open suction space 32 is connected by conduit 44 to a suction fan 46. Fiber-feeding means is provided so that the suction may draw fiber and air into the mold space 19. With suction as described, fiber and binder may be drawn in with air from the atmosphere for deposition in the space 19 as it is opened by entry of the mold into space 32.

Numeral 50 represents an elbow-like fitting positioned at the end of the cylinder cell wall 30 with its opening coincident with and closing the mold space 19 so as to direct fiber into the space 19. The fitting 50 has a sealed opening 51 through which passes the mandrel 40. The opening 51 and the mandrel-support 42 are spaced apart and together they position the mandrel properly centered as described.

Means to feed dispersed fiber into fitting 50 is represented diagrammatically by the block 54 representing a mechanical disperser, into which is fed proportioned amounts of fiber 56 to be dispersed and comminuted binder 58, such as thermosetting or thermoplastic resin, these being supplied respectively by continuous measuring devices, such as a volumetric feeder 60 for fibrous material and a weighing feeder 62 for binder.

The dispersing means 54 will vary according to the fiber, because some apparatus suitable for vegetable fiber is unsuitable for mineral fibers. Vegetable fiber may be readily dispersed by passing a supply of fiber through means such as a hammer mill or a fan blower, which means may discharge directly into fitting 50. When a blower is used it creates superatmospheric pressure at the entrance to space 19. Such a fan blower can also be fed with a mixture of fiber and binder, its exhaust end being sealed tightly to fitting 50, or 50', as indicated schematically in FIG. 5. Mineral fibers require a more specialized disperser as described hereinafter.

In operation of the apparatus shown in FIG. 1, the suction fan 46 is operated, dispersed fiber and binder are delivered or drawn into the mold space 19, and the mold comprising shells 11–12 and 16 are gradually pulled away from the shields comprising wall 30 and mandrel 40. At the start of pulling, the projecting end of the mold has the cylindrical walls of its two shells exposed to the suction through the foramens removed from their blocking means. Also, the end of the mold is so exposed when there are the foramens 23 in the end plate 20. Thus, the fiber is felted by venting air at the exposed projecting foramens of the mold exposed to space 32. If said exposed end of the mold were then made stationary while fiber and air are introduced, there would be more resistance to air flow as the fiber felt builds up within the space 19. This would create less impact of felting as the deposit grows, and this would result in a less dense felt. But, by controlled progressive withdrawal of the mold from its cell, the locale of felting can be maintained in the immediate vicinity of the opening of the cell 30, and the impact of felting, and hence the formation and density of the felt, may be made substantially uniform along the mold until it is filled.

The filler mold on leaving the cell of wall 30 resides in whole or in part in the extension 34, from which it may be removed by removal of the cap 36. The mold is then disconnected from rod 26 at the pin 24, and heated, preferably by passing hot air through the felt crosswise of its length from shell to shell, to activate the binder and thus integrate the felt in the mold. Then, the outer shell 10 is opened at hinge 13, exposing a felted form as shown in cross-section in FIG. 4 and FIG. 6. For pipe covering the form may be molded continuously circumferentially as in FIG. 6 and then cut into openable half portions for use. To avoid such cutting, it can be felted with a parting plane 70 between two half portions 71 and 72, and an opposite incomplete parting plane 74 to leave at the periphery a thin connecting hinge portion 76, permitting opening the form to remove the inner shell 16.

To effect the parting planes 70 and 74 in depositing the fiber, the inner shell 16 (FIG. 2) may be provided with corresponding wings or flanges 70' and 74'. FIG. 2a shows the filled mold in process of being opened. The two halves of the bonded fiber tube may be opened when applying to a pipe. An exemplary pipe covering has an outside diameter 4.5 inches, and an inside diameter 2.40 inches for a 2-inch pipe with normal 1-inch walls.

FIG. 5 shows a modification, especially useful for vegetable or other fiber which can be dispersed without damage to its felting properties. The fiber and binder are fed to a fan blower 80, connected to a fitting 50', like the fitting 50 of FIG. 1, which is conncted to a cell-forming housing 30'. In such a case the foraminous mold, having outer shell 10' and inner shell 16', is drawn by means such as rod 26' out of the cell and off mandrel 40' into a region of atmospheric pressure. Felting according to this method may follow the conditions described in the U.S. patents to Heritage Nos. 2,439,601 to 2,439,604. A vented housing (not shown) may be provided to carry away escaping dust.

It is to be understood that the wings 70' and 74' of the inner shell, as shown in FIGS. 2 and 2a may be omitted, thus forming a continuous tubular felt 71' of FIG. 6, from which the inner shell may be readily removed by twisting and pulling to sever contact at the interface, the outer shell being hinged and mounted in the same manner as shown in FIGS. 2 and 3.

In order to show that elongated forms of various uniform cross-section may be felted, FIG. 2b illustrates a modification of the foraminous mold. The mold produces a shape having an inverted U in cross-section. It has a U-shaped screen 12' and a U-shaped screen 11' with outwardly extending wing portions 11" on which the ends 42" of screen 12' rest. The cell is a rectangular housing 30", on the bottom of which rests a rectangular shield 40" substituting for the mandrel in FIG. 1.

The mold may be formed to produce two identical halves with cooperating interfitting parts for assembly into annular form. Such a mold is shown in FIG. 2c wherein semicylindrical screens 11' and 12', hinged at 13', constitute the outer wall. The inner wall is provided by cylindrical screen 16' to which are secured diametrically opposite wings 70ᵃ and 74ᵃ extending to the outer wall. These wings are provided with identical offset portions 75 and 75' located to form in each half of the felt a key and a keyway.

The invention is not limited to the embodiments as described above, in order to effect relative movement between the foraminous mold and the blocking means for the foramens of the mold. In another form, a construction is used in which several locations are provided for a number of foraminous molds. Thus, the apparatus for feeding the fiber may operate continuously, filling at least one mold while another, or others, already filled is being removed.

Figure 7:
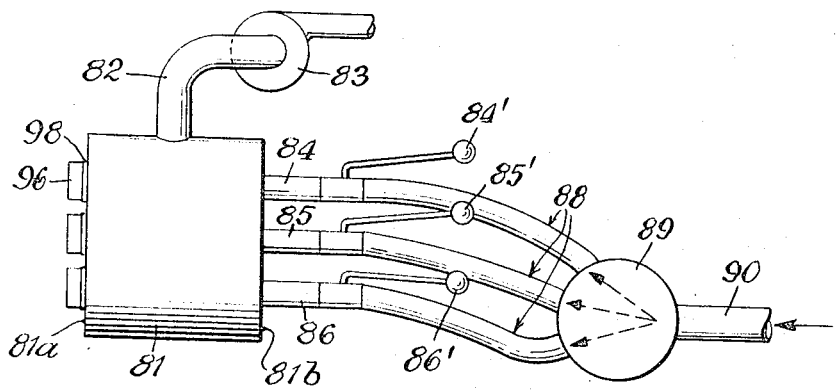
FIG. 7 is a diagrammatic sketch of the apparatus shown in FIG. 8 as it is connected to conduits to feed material and to exhaust air.

FIGS. 7, 8 and 9 show such an apparatus in which three of a plurality of mold locations are illustrated in detail for permitting continuous operation. In this form, there is an evacuating chamber having a plurality of air-venting means providing a track for axially sliding into and out of the chamber a foramen-blocking hollow cell or plunger housing for a foraminous mold. The track means extends from one wall to an opposite wall which walls have openings at the ends of the track means. The opening in one wall permits the insertion of an empty foraminous mold into a plunger housing or cell fully inserted into the chamber, and permits the relative withdrawal of the mold from the chamber when the mold is filled. At the mold-discharging end of the plunger cell, there is a sealing door in the chamber side wall. At the opposite wall the opening is sealed by the cell acting as a plunger which slides on said track means into and out of the chamber. The plunger cell is slidable relative to an inserted empty foraminous mold progressively to open passage through the foramens of the outer mold wall. The plunger cell carries a cantilever supported mandrel which supports the wall of the inner shell of the mold against deflection by applied air pressure in the stream fed onto the mold. In this form, it seems unnecessary for the purpose of felting to have a foraminous inner wall, but for moving hot air through the felt to thermoset a resin binder, the inner wall is made foraminous and it thus functions in felting.

FIG. 8 shows diagrammatically a closed chamber 81, preferably cylindrical, connected by conduit 82 (FIG. 7) to an exhaust fan 83. Three plunger cells 84, 85 and 86 are shown in FIG. 7, fully inserted, each of these being progressively withdrawable from the chamber 81 by the respective diagrammatic means 84', 85' and 86'. Each plunger is connected by one of the flexible conduits 88 to one of the outlets of a three-way valve 89 into which a conduit 90 feeds an air stream containing feltable fiber, either mineral or vegetable, and suitable binder, either as a powder mixed with the fibers, or as binder on the fibers or as binder-fibers. The stream in conduit 90 is preferably under pressure, but it may be a stream drawn into the conduit by the suction fan 83.

FIGS. 7 and 8 show the position of the three plunger cells in a cylindrical housing 81. In FIG. 9, there are shown six locations, represented by doors in the end wall of chamber 81 as later described. Those shown in the right half constitute one operating set, which is duplicated in the left half. Only the right hand set is described.

The housing 81 as shown in FIG. 8 has two opposite parallel end walls 81ᵃ and 81ᵇ, each of which has two openings for each unit. Only one unit is described, this being the top location for the plunger cell 84. Wall 81ᵇ has opening 92 through which plunger cell 84 moves. A sealing gasket 93 is provided. Wall 81ᵃ has an opening 94 suitable for passage of a foraminous mold 95. A box-like cover 96 hinged at 97 (FIG. 9) with gasketed edge 98 (FIG. 8) provides a tight seal over opening 94 in wall 81ᵃ. Inside the chamber the opening 94 has a gasket 94' against which the end of plunger cell 84 abuts to seal the interior of the cell 84, from the interior of chamber 81, thus permitting opening of door 96 and removal or insertion of a mold. From opening to opening in the opposite side walls are spaced rods or the like 99 arranged to form tracks, such as a tubular channel, in which slides the plunger cell 84 and in which the filled mold 95 is supported.

The mold 95 has inner cylindrical shell 100 and outer foraminous shell 101 in two semi-cylindrical portions hinged together as described in reference to FIG. 2, with or without the internal partitions 70 and 74. The end of the tubular mold space is open at the chamber wall 81ᵇ for receiving fiber to be felted.

At the end of the mold space adjacent chamber wall 81ᵃ means are provided for venting air into chamber 81 from foramens of either or both of the inner and outer shells 100 and 101 of the tubular mold 95. The inner shell 100 terminates within the terminus of the outer shell 101, and is closed by a foraminous plate 64 secured to the shell. Adjacent the plate 64 inwardly from the end of shell 101 is a foraminous plate 63 closing the tubular space of the mold. Plate 63 is carried by one semi-cylindrical portion of the outer shell inwardly from its end, leaving the other portion free for opening at a hinged connection. Plate 63 overlaps into plate 64 and has an opening 63ª therein through which extends with a close fit a short length of pipe 65 secured to and projecting from plate 64 beyond the wall 81ª.

At the end of outer shell 101 there is a second foraminous plate 63′ substantially duplicating the plate 63, similarly secured to shell 101, and similarly provided with an opening 63ᵇ for said pipe 65. A handle 67 is carried by plate 63′ within the space of the door 96.

By providing adjacent plates 63 and 64, it is possible to use different sizes of inner shell 100 for a given outer shell 101. Over the end of pipe 65 is a clamping device, such as a nut 66 positioned fixedly on the pipe and against plate 63′. Pipe 65 functions as a centering means. It may be perforated as shown.

In the position shown for plunger 84, no air can be vented from the mold. As soon as the plunger 84 and mandrel 84ª therein (later described) are drawn to the right in FIG. 8, air can vent into the chamber 81. Initially venting takes place only through the inner shell 100, moving through foraminous plate 64 into the space 68 between plates 63 and 63′ and moving also into pipe 65. From pipe 65 it may exit through any perforations therein into space 68, or through the end of pipe 68 into the door space and back through plate 63′ into space 68. From space 68 air exits through the opening space between gasket 94′ and the end of plunger cell 84. Also, at initial withdrawal of plunger cell 84 fiber can felt against end plate 63. After the end of the plunger cell reaches the plate 63, then air can vent through the outer shell 101, entering chamber 81 between the rods 99 forming the track or support for the mold 95 as the shielding plunger cell 84 is withdrawn.

Although the inner shell 100 has been described as foraminous it is to be understood that it may be imperforate when the outer shell is foraminous, and also that the outer shell may be imperforate when the inner shell is foraminous. For felting at least one shell must be foraminous. However, it is preferred to have both shells foraminous, not only to facilitate felting, but to provide a tubular felt encased within foraminous inner and outer shells, so that a thermosetting binder content therein may be set by forcing hot air through the tubular wall of the felt crosswise of its length. Although the foraminous shells have been referred to generally, and sometimes as screens, it is to be understood that the shell wall need not be a single foraminous shell. In large sizes of shells, the small foramens necessary to retain the fibers and any powdery binder, may be provided by lining a strong coarse-mesh screen for strength, with a fine-mesh fabric or screen insufficiently strong per se to maintain the shape of the shell. As a fabric, the inner mesh material may be retained with the felt therein.

The plunger cell 84 is a thin-walled air-tight cylindrical sheet extending outwardly from the chamber 81 for a sufficient length to provide cantilever support for a mandrel 84ª centered to support the inner shell 101. Preferably, the mandrel 84ª is hollow for light weight, and is supported by a shaft 84ᵇ supported in turn by spaced spiders 84ᶜ. By reason of the end support imparted to the inner shell 101 by the pipe 65, the inner shell supports mandrel 84ª during the felting operation and in the initial positions of the plunger and the mold as ready for felting.

The remaining two positions for plunger cells 85 and 86 duplicate the structure described for plunger cell 84, but show progressive positions of withdrawal.

In operation, the conduit 90 continuously supplies material including fiber through valve 89 to one of the cells in sequence through a repeating cycle. At the start, all the plunger cells are against the seals 94′ at wall 81ª, and each contains an empty foraminous mold 95. Thus, there is no passage for air from conduit 90 to operating exhaust fan 83. At the start of supplying fiber, plunger 84 is slightly withdrawn, thus starting a mat as described in reference to FIG. 8. The plunger is withdrawn as the felting proceeds, the control of withdrawal being indicated by observation of pressure changes in the chamber 81. The mat M shown at the end of middle plunger 85 grows as indicated in the bottom unit of FIG. 8.

When the mold for cell 84 is filled, the valve 89 is turned to supply the mold in cell 85 and the plunger cell 84 is inserted to the gasket 94′ at wall 81ª. When the second mold is filled, the third cell 86 is gradually withdrawn and cell 85 inserted to seal at the wall 81ª. As soon as cell 84 is sealed at the wall 81ª, the door 96 is opened, the filled mold removed and an empty mold inserted. This is repeated at cell 85 and so on, permitting continuous operation of the apparatus with successive fillings, removals, and empty-mold insertions. By providing two independent units of three molds each, the apparatus is more flexible. It is to be understood, however, that any number of mold units may be arranged for operation in sequence, as described.

The filled molds are then processed to set the binder. When the binder is thermosetting resin, such as powder contained in the melt, hot air may be blown through the felt by suitable means until the resin is activated and thermoset. Then, the mold is opened and the form removed as described earlier herein.

Although the mold 95 has been described as rigid for reuse, it may have a removable liner of fine-mesh woven fabric suitable to vent the air in felting and suitable to be retained on the formed felt to line the outer wall, and suitable to be extended to provide a complete lining for a felt such as illustrated in FIG. 4a. FIG. 4a shows a pipe covering felt 71ª similar to that in FIG. 4, wherein the outer shell of the mold is initially lined with a woven fabric F having ends F′ and F″ placed together over a partition in the mold such as shown at 70′ in FIG. 2a. In FIG. 4a the interior of the felt is not lined. However, it may be lined by providing a fabric stiffened to have a cross-section as shown in FIG. 10. Such a fabric may be stiffened with starch or resin and formed as a mold, so as to hold its shape sufficiently for insertion into a structural mold as described. FIG. 10 illustrates in cross-section how such a fabric may be shaped. One end of sheet 105 starts the outer shell at 106, turns in at 107 forming a partition 108, then half the inner shell 109, then is turned and reversed on itself to form a partition 110, then the remainder 111 of the inner shell, then to overlie partition 108 and 111, then to form the complete outer shell 112 until end 113 laps over end 106.

To eliminate the hinged screen mold, the outer wall may be a continuous cylindrical wall with perforations too large to effect felting thereon. A sheet of fine mesh flexible screen with overlapping edges lines the outer wall. After forming the felt and setting its binder, the liner and felt may be easily withdrawn from the perforated cylinder, and the fine mesh screen peeled from the felted body, which may vary according to the nature of the inner core.

FIG. 10a shows a strong hollow cylinder 117 with holes 118 therein. Numeral 119 represents a flexible fine mesh screen with overlapping edges 119′, lining the cylinder. FIG. 10b shows the filled liner being withdrawn from the cylinder. The inner core shown is that shown in FIG. 2, having inner screen wall 16′ and the key-forming wings 75 and 75′.

The apparatus above described are limited to production of fixed outer sizes of elongated felts, such as the tubular forms for pipe coverings. In practice, various sizes are required for pipe coverings. These can be produced by providing removable fixtures of different shapes and sizes to fit a permanent housing and to serve as the foramen-blocking means. By so doing, some additional advantages are secured.

FIG. 11 is a modified form of the apparatus shown in FIG. 1, in which the foramen-blocking means or shield is located on the inside of the mold rather than on the outside as illustrated above. By this expedient and using thin imperforate sheet material as the foramen-blocking means, the fibers introduced in the air stream flow along smooth walls rather than along the foraminous walls, which in the case of wire screens offer substantial resistance to smooth flow.

FIG. 11 shows in principle how one unit may be constructed, it being understood that the principles thereof may be incorporated in a modified form of the multi-unit apparatus of FIGS. 8 and 9. To simplify the explanation the modification is illustrated by incorporating it in an illustrative embodiment similar to that of FIG. 1. A permanent housing 120 provides a hollow cylindrical space open at the right end for introduction of air-suspended fiber, and open at the left end into an evacuated chamber 121 formed by walls 122, containing one or more suction conduits 123 for evacuating space 121. Opposite that end of housing 120 which opens into space 121 is a tubular receiving housing 124 extending the evacuated chamber 121. The receiving housing is closed by a removable cap 125 through which in sealed relationship extends a manipulating draw-rod 126.

Draw-rod 126 has at its inner end a recess 127, such as a hole or the opening of a hook for temporary connection to a foraminous mold in which the felt is formed.

For forming pipe coverings the mold is foraminous and has an outer foraminous cylinder shell 130, and an inner shell 131 which is preferably foraminous with shielding means, but which may have foramens which do not function in felting as described in reference to FIG. 12. The left end of the mold is shown as closed by a plate 132 which may have fiber-retaining foramens 133 over the space between the inner and outer shells, and which is open at the center when the inner shell 131 is foraminous in order to vent air into the evacuated chamber 121 from the foramens of the inner shell. Plate 132 carries on its outer face a ring flange 134 with diametric holes 135 therein for a pin 136 to be latched onto by the recess 127 in draw-rod 126. The inner shell 131 projects from plate 132 to the right concentrically and in such position is supported only by a hollow core 140 forming part of a removable fixture 141 in which the inner shell 131 fits closely to block any foramens and in which it slides to unblock any such foramens.

The fixture designated generally by the numeral 141 is entered into and removed from the right hand end of housing 120, and projects into housing 120 concentrically with sealed support by a ring 142 fitting over the end of the housing 120.

The fixture also comprises a thin-walled imperforate cylinder 143 forming an annular space 144 between it and the housing 120, in which space slides the outer shell 130 of the foraminous mold in close relation to the outer wall of cylinder 143. Shell 130 and fixture wall 143 are of relative sizes effectively to block the foramens in shell 130. The right end of the cylindrical blocking shield 143 is provided with mounting means for fixing it in the shown position in the housing 120. Such means includes a conical extension 145 flaring outwardly and welded to said mounting ring 142.

The inner tubular core 140 of the fixture has its left end open and is of size to have a telescopic fit with inner mold shell 131. Core 140 is carried entirely by the outer fixture wall 143 by connecting links such as rods 146, these being small so as not to obstruct the passage of the fiber suspension through the space 147 between the fixture wall 143 and the core 140. The arrows marked 147' in the space 147 represent the flow of air and fiber.

The air and fiber are intoduced to the fixture through a conduit represented by its terminal end 150 in sealed contact with the conical extension 145. The core 140 is provided with a concentric pointed nose 151 to deflect the air stream into the annular space 147, from which it issue into the left end of the foraminous mold, there to lose its air and form a felt. As a felt 153 is formed, the mold is moved to the left, opening more of the foramens to function in felt formation. When the mold is filled the operation is finished as described in reference to FIG. 1.

In FIG. 11 the plate 132 is shown open to exhaust air from within the inner shell 131. Were this closed instead of open, foramens in shell 131 could not function. Nevertheless, the venting only through the outer shell 130 will permit packing of felt against the inner shell, due to the differential pressure between space 147 and chamber 121.

Accordingly, it is not necessary for the inner shell to be foraminous and it may be made imperforate. When it is imperforate, there is no need for providing the open-ended core 140, from which the inner shell 131 of FIG. 11 is withdrawn.

There is a special advantage of providing the shielding means inside the foraminous mold. The housing 120 is made of a size to house the largest mold of a set having smaller molds. For the smaller molds there are smaller fixtures which all have ends fitting over the end of housing 120 with a conical flange similar to flange 145, but wider. Thus, the feeding conduit 150 fits all the fixtures. By mounting all the fixtures in the same way, they project concentrically into housing 120. The smaller molds thus have their outer shells slide over the outer wall of the fixture, and their inner shells slide into and out of the hollow core of the fixture.

When the inner shell of a mold such as that described for pipe coverings is imperforate or has foramens which do not function in felting, the fixture of FIG. 11 may be constructed in modified form as shown in FIG. 12. In FIG. 12, the foraminous mold has wire-screen outer shell 130' and a perforate inner shell 131' with foramens 131''. The end of shell 131' has a pointed nose closure 151'. The fixture has outer wall 143', lacks an inner wall, and has conical extension 145' connected to mounting ring 142'.

To prevent the unshielded foramens 131'' of the inner shell 131' from functioning during felting the open end of the inner shell 131' is blocked by a removable tubular plug 151ᵃ. The outer ends of the plug and of the inner shell 131' have holes through which passes the locking pin 151ᶜ. The plug 151ᵃ is removable so that the foramens 131'' may be used in passing hot air through the felt from shell to shell to set the resin binder.

The foraminous mold of FIG. 12 may be formed with its outer shell in two parts 130ᵃ and 130ᵇ hinged at 155 as shown in FIG. 13. Core 131' has a radial rib 157 extending radially to the outer wall 143' of the fixture so as to rest thereon for some vertical support. Core 131' has an opposite short radial rib 158 to form a "cut" in the felt opposite an opening "cut" therein formed by the rib 157. On opening the outer shell the core 131' may be removed.

In FIG. 12, the rib 157 has an end 159 extending beyond the end of the foraminous mold, which end is shown with an upwardly curving edge 160 to facilitate inserting the mold into the fixture. Also in FIG. 12, the rib 158 is shown with an end 161 extending beyond the mold, which may have a curved edge as shown.

The various embodiments above described depend upon differential pressure between the interior and exterior of the mold. The high pressure inside the mold may be atmospheric pressure or greater when the exterior pressure is subatmospheric. When the interior pressure is superatmospheric, the exterior pressure may be atmospheric pressure, or a slight degree less in order to collect dust and fines.

Experience with pneumatic felting into closed vented space has shown that better felting and higher differential pressure may be secured by use of superatmospheric pressure. This permits combining dispersing and conveyance of the dispersed fibers in a pressure conduit.

As indicated above, the fibers may be vegetable fibers or mineral fibers. The disperser is adapted to the fiber employed. For pipe coverings and certain other thermal uses, mineral fibers are preferred. A dispersing and conveying system for either vegetable fibers or mineral fibers suitable for use in the present invention is shown in FIG. 14.

In principle, the apparatus has one or two pairs of meshing brush rotors of which the bristles overlap to a slight extent. One rotor operates at high speed, at least sufficient to function as a blower for moving air and fiber into a conduit, when no other means is provided for the purpose. The other rotor of the pair is relatively slower to function as a holder and feeder of a supply of fiber to be dispersed.

FIG. 14 shows a conveying conduit 170 into which dispersed fibers in a vehicle of air are discharged. The conduit entrance is topped with a closed connection by a housing 171 containing said rotors. The housing 171 has closing side walls and an open entrance end 172 and open exit end 173. At the open top 172 of the housing 171 means is provided to feed fibrous material to be dispersed for felting, and means to feed other material to be deposited with such fiber, which other material may be a second kind of fiber or material such as a powder form of binder which can be activated by heat in the felt to be formed. The second kind of fiber may be fiber coated with a suitable thermosetting resin, or be thermoplastic fibers to function as binder.

A fiber feeding means is shown in the form of an endless feeding belt 175 running over pulley 176. Fed fiber is indicated at 177. A second feeder is shown as endless belt 178 running over pulley 179, and feeding, for example, thermosetting resin powder 180 into the housing 171.

In the housing there is at least one set of dispersing rotors, and preferably two sets, which are constructed, positioned, and operated so that as they disperse fibrous material 177 they also draw in air so as to discharge the dispersed fibers in a stream of air. Crossing the housing 171 are two brush rotors indicated by parallel rolls 182 and 183. Each roll has a brush-forming multiplicity of bristles projecting radially as indicated by the numerals 184 and 184'. The ends of the bristles of each rotor just touch or overlap the path of the ends of the bristles of the other rotor during rotation of the two. The rotors are adjustable toward and away from each other in order to control the extent of overlap and also to compensate for wear. The extent of overlap may be up to $3/16$-inch, when the rotors are about 12-inches in diameter.

A duplicating set of rotors is shown below the rotors 182 and 183 as indicated by the numerals 182' and 183'. Rotors 182 and 182' are indicated for operation at slow speed, for example, 5 r.p.m. and rotors 183 and 183' for high speeds, for example, 960 r.p.m. These relative speeds are not critical, since speeds of 1 and 3600 r.p.m. have been used, and also 5 and 765 r.p.m. When two sets of rotors are operated, the high speed rotors may be slowed somewhat over the effective high speed for a single set, but must have speed sufficient in connection with the air stream through the housing to effect dispersion of the fibrous material fed to the nip.

Also, the nature of the brush rotors may be varied. When the rotors 182 and 182' are 12-inches in outside diameter, the bristles may be steel wire 0.0140-inch in diameter and 3.25-inches long. When the rotors 183 and 183' are 12-inches in outside diameter, the bristles may be steel wire 0.0118-inch in diameter and 2.75-inches long. The bristles are thickly concentrated on the core where they are mounted, both around the rotor and along the rotor, so that at the cylindrical periphery the free ends are substantially uniformly distributed.

With two sets of brush rotors, a single drive means is provided for rotors 182 and 182', such as a driven gear 185 connected by chain 186 to the two rotors outside the housing 171. Chain 186 passes over adjustable idler gear 187 to permit adjustment of either or both of rotors 182 and 182'. For rotors 183 and 183' a second driving gear 185' is provided with chain 186' and idler gear 187'.

Because the high speed rotor 183 or rotors 183 and 183' act as fans, the desired generation of an air stream through the housing 171 is effected by baffles 189 and 190 extending downward from opposite side walls respectively to the vicinity of the tops of the rotors 182 and 183, thus terminating substantially at that tangent to the rotor which is at right angles to the side wall of the housing. These baffles not only guide fed material to enter the nip 192 of the top set, but cut off up-currents of air along the side walls beneath the baffles. Like baffles 189' and 190' are positioned over the second set of rotors.

The material fed to enter the nip 192 is held by the slow rotor 182 which slowly feeds into the nip. The fast rotor 183 combs fibers from the supply and hurls the fibers and any material 180 away from the nip in a stream of air. When two sets are present, the air stream is directed toward nip 192' of the second set, which provides additional velocity of movement out of housing 171 into conduit 170.

The conduit 170 of FIG. 14 in one use represents the conduit 90 in FIG. 7, may also represent the conduit 50 in FIG. 1, and the conduit 150 in FIG. 11. The apparatus of FIG. 14 may be used to denodulate and deshot nodulated mineral fiber, in which use it is desirable to have a shot-trap connected to the system between duct 170 in FIG. 14 and duct 90 in FIG. 7, for example, as described in my copending application, Ser. No. 255,422, filed January 21, 1963, now Patent No. 3,252,186, issued May 24, 1966.

I claim:

1. Felting apparatus comprising wall means forming a region closed from the atmosphere, air-exhausting means for producing subatmospheric pressure in said region, said wall means including a chamber wall with an opening therein, a door movable into position surrounding and sealing said opening, said door providing space therein extending outwardly from said opening, said chamber having a second chamber wall opposite said first-mentioned chamber wall with an opening therein alined with said opening in the first chamber wall, track means extending between said two chamber walls from around the openings thereof, a tubular plunger open at both ends and movable in said track means and in sealed relation through the openings of the second chamber wall into and out of sealed relation with the first chamber wall around the said opening therein, a foraminous mold of size to pass through the opening in said first chamber wall and to fit in close contact with the inner wall of said tubular plunger, said mold having an elongated tubular mold space comprising a foraminous outer shell, a parallel inner foraminous shell, and a wall at but one end, said inner shell being open at its end opposite said end wall, a plate closing the other end of said inner shell and having an opening therein registering with the interior of said inner shell, said outer shell having said end wall adjacent and overlapping said plate and having an opening therein registering with the opening in said plate, said outer shell extending beyond said end wall, a second plate closing the extended end of said outer shell and having an opening therein alined with the openings of said first plate and said end wall, a tubular member carried by said first plate and passing through the openings of said end wall and said second end plate, means removably secured to the end of said tubular member beyond said second end plate for moving the inner shell with said second end plate in the direction of the projecting tubular member, said outer shell being formed in two complementary parts adapted for separation to remove a felt formed in the mold space, said end wall and said second plate being secured each to but one of said parts, at least one of said tubular member and of said second end plate being perforate for the passage of air from within the inner shell to the space between said end wall of the mold space and said second plate, said tubular plunger at its end adjacent the second chamber wall carrying a core projecting into and filling the inner foraminous shell when said tubular plunger is in sealed relation with said first chamber wall, feeding means connected to the open end of said tubular plunger which extends from said chamber, said feeding means being adapted to feed air containing suspended feltable fiber, and means to withdraw the tubular plunger from said chamber progressively as fiber felts in said mold during said feeding.

2. Apparatus comprising an axially movable elongated tubular mold formed by wall means having fiber-retaining foramens and having a first and single open end, a closed second end, and an outer foraminous tubular wall, shielding means for the foramens of said mold in an initial position, said shielding means including a tubular housing for said mold with housing walls which block passage through said foraminous tubular wall in said initial position of said mold, said housing having an end opening through which said mold may exit from said housing, mold-receiving and supporting means aligned with and spaced from said opening of the housing, the space between said opening and said mold-receiving means being a portion of a chamber closed for retaining sub-atmospheric pressure, means to generate sub-atmospheric pressure in said chamber, said mold-receiving means having a normally closed opening through which said received mold may be removed to the atmosphere after passing through said chamber, openable means closing said opening of said receiving means, means to move said mold from its initial position across said chamber and into said receiving means, means to feed air containing suspended fiber and heat-activatable binder into said open end of said mold in its initial position and in its moving positions, whereby in exit from said housing the foramens of said tubular wall are open to said chamber for depositing fiber as a felt against the mold walls, whereby during a controlled rate of movement of said mold there is formed a felt in said mold extending from its said closed end to its said open end.

References Cited
UNITED STATES PATENTS

| | | | |
|---|---|---|---|
| 1,543,288 | 6/1925 | Laukhuff | 18—42 |
| 1,907,307 | 5/1933 | Smith | 138—149 |
| 2,403,780 | 7/1946 | Baribieri | 18—42 |
| 2,544,019 | 3/1951 | Heritage | 264—121 |
| 2,610,138 | 9/1952 | Heritage | 264—121 |
| 2,936,259 | 5/1960 | Childers | 138—149 |
| 3,000,055 | 9/1961 | Schlicksupp | 18—30 |

FOREIGN PATENTS 507,476 6/1939 England.

ROY B. MOFFITT, *Primary Examiner.*

L. J. LENNY, ROBERT F. WHITE, *Examiners.*

J. R. HALL, *Assistant Examiner.*